United States Patent
Hirano et al.

(10) Patent No.: US 11,622,250 B2
(45) Date of Patent: Apr. 4, 2023

(54) IN-VEHICLE NETWORK SYSTEM

(71) Applicants: TOYOTA JIDOSHA KABUSHIKI KAISHA, Toyota (JP); MAZDA MOTOR CORPORATION, Hiroshima (JP)

(72) Inventors: Takahiro Hirano, Toyota (JP); Tetsuhiro Yamashita, Aki-gun (JP); Yoshimasa Kurokawa, Aki-gun (JP)

(73) Assignees: TOYOTA JIDOSHA KABUSHIKI KAISHA, Toyota (JP); MAZDA MOTOR CORPORATION, Aki-gun (JP)

(*) Notice: Subject to any disclaimer, the term of this patent is extended or adjusted under 35 U.S.C. 154(b) by 329 days.

(21) Appl. No.: 16/998,054

(22) Filed: Aug. 20, 2020

(65) Prior Publication Data
US 2021/0067929 A1    Mar. 4, 2021

(30) Foreign Application Priority Data

Aug. 30, 2019  (JP) .............................. JP2019-157922

(51) Int. Cl.
*H04W 4/48* (2018.01)
*H04L 12/40* (2006.01)

(52) U.S. Cl.
CPC .............. *H04W 4/48* (2018.02); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | |
|---|---|---|
| 2014/0133350 A1* | 5/2014 | Triess ..................... H04L 12/66 370/254 |
| 2014/0341224 A1 | 11/2014 | Armbruster et al. |
| 2014/0376561 A1 | 12/2014 | Armbruster et al. |
| 2015/0281022 A1 | 10/2015 | Harata et al. |
| 2018/0041874 A1* | 2/2018 | Kelly ................... H04B 5/0031 |
| 2019/0273632 A1 | 9/2019 | Holzmann et al. |
| 2020/0125858 A1* | 4/2020 | Bauer ..................... G06V 20/56 |
| 2020/0269782 A1 | 8/2020 | Fujihira et al. |
| 2020/0304335 A1* | 9/2020 | Yanagida ................. H04B 3/52 |
| 2021/0061194 A1 | 3/2021 | Sugawa et al. |
| 2021/0309167 A1* | 10/2021 | Gourari ................. H04L 12/437 |
| 2022/0006669 A1* | 1/2022 | Wang .................... H04L 12/437 |

FOREIGN PATENT DOCUMENTS

| | | |
|---|---|---|
| JP | 2014-078800 A | 5/2014 |
| JP | 2019-041171 A | 3/2019 |
| JP | 2019-104338 A | 6/2019 |
| JP | 2019-134301 A | 8/2019 |
| WO | 2018/050648 A1 | 3/2018 |

* cited by examiner

*Primary Examiner* — Angela Nguyen
(74) *Attorney, Agent, or Firm* — Oliff PLC

(57) ABSTRACT

An in-vehicle network system includes an upper device, a first intermediate device, and a first lower device. The first intermediate device includes a first communication unit and a second communication unit that are arranged redundantly and that have a communication function. The first intermediate device is configured to communicate with the upper device via a plurality of communication paths. The first lower device is connected to the first communication unit and the second communication unit of the first intermediate device.

7 Claims, 4 Drawing Sheets

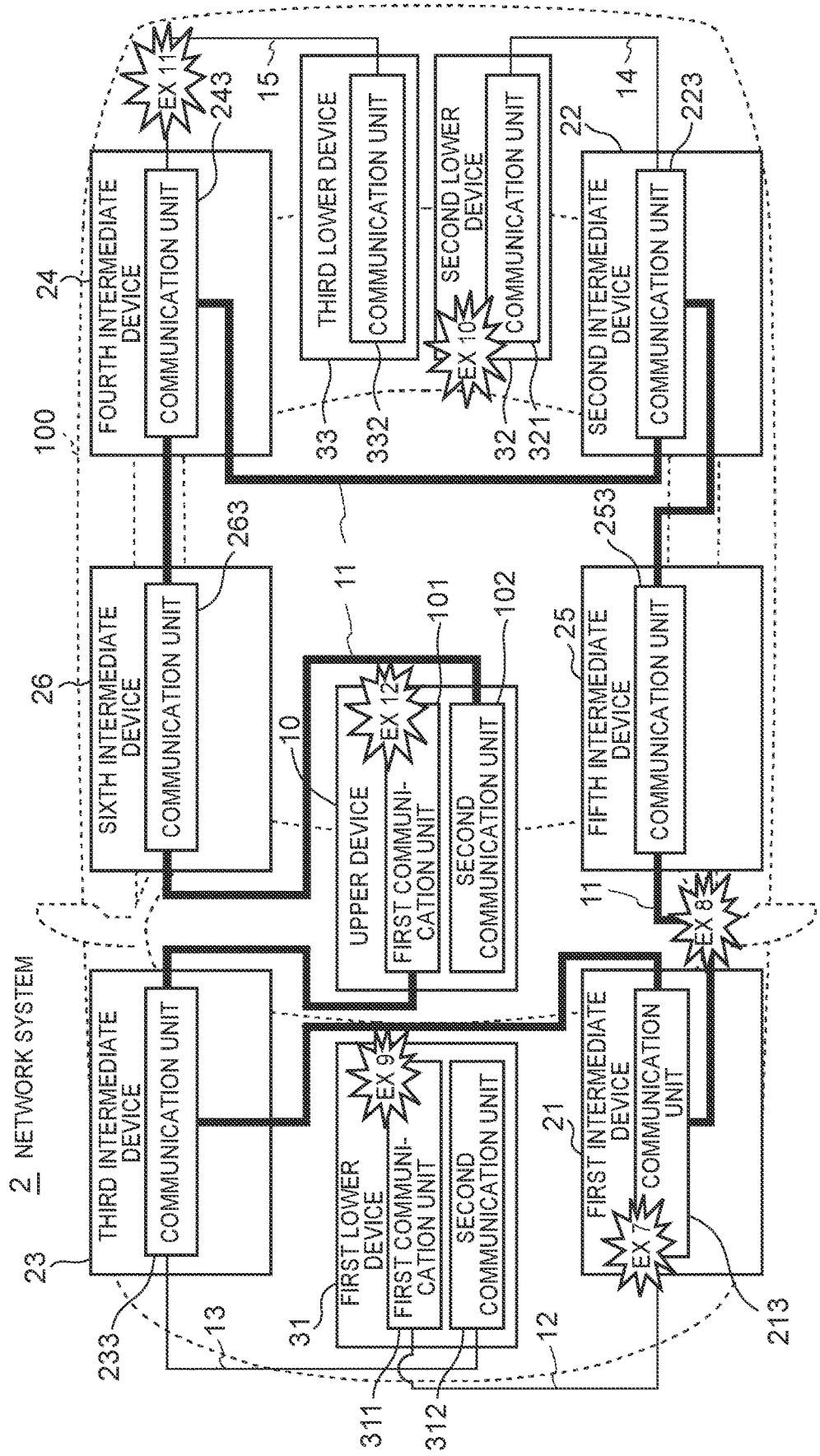

IN-VEHICLE NETWORK SYSTEM

INCORPORATION BY REFERENCE

The disclosure of Japanese Patent Application No. 2019-157922 filed on Aug. 30, 2019 including the specification, drawings and abstract is incorporated herein by reference in its entirety.

BACKGROUND

1. Technical Field

The disclosure relates to an in-vehicle network system mounted on a vehicle or the like.

2. Description of Related Art

A plurality of electronic devices called electronic control units (ECUs) and a plurality of electronic component devices are mounted on a vehicle. These devices execute respective functions of the vehicle.

Japanese Unexamined Patent Application Publication No. 2014-78800 (JP 2014-78800 A) discloses a network system having a tree-type connection topology. That is, in the network system, one ECU serving as an upper node has a plurality of communication lines, and a plurality of ECUs serving as lower nodes are connected to each of the communication lines.

SUMMARY

In such a network system described in JP 2014-78800 A, it is conceivable to use a high-performance device with integrated functions for vehicle control as the upper node, and to use a simplified device that is controlled by the upper node as the lower nodes. It is also conceivable to further provide an intermediate node having a gateway function between the upper node and the lower nodes. However, in such a configuration, if a failure occurs in a communication line, an intermediate node, or the like, there is a possibility that the upper node cannot perform control thereof and its function cannot be exhibited. Thus, when functions are integrated into a higher node in a network system, there is room for consideration for improving robustness.

The disclosure provides a highly robust in-vehicle network system.

A first aspect of the disclosure relates to an in-vehicle network system. The in-vehicle network system includes an upper device, a first intermediate device, and a first lower device. The first intermediate device includes a first communication unit and a second communication unit that are arranged redundantly and that have a communication function. The first intermediate device is configured to communicate with the upper device via a plurality of communication paths. The first lower device is connected to the first communication unit and the second communication unit of the first intermediate device.

In the in-vehicle network system according to the first aspect, the first intermediate device may be configured to function as a gateway that relays communication between the upper device and the first lower device. The upper device may be configured to create control data for controlling an actuator mounted on a vehicle and transmit the control data to the first lower device via the first intermediate device. The first lower device may be configured to control the actuator based on the control data.

In the in-vehicle network system according to the first aspect, the in-vehicle network system may include a plurality of intermediate devices including the first intermediate device. The upper device and the intermediate devices may be connected to each other by a communication line provided in a ring.

In the in-vehicle network system according to the first aspect, the first lower device may include a first lower communication unit connected to the first communication unit of the first intermediate device, and a second lower communication unit connected to the second communication unit of the first intermediate device.

A second aspect of the disclosure relates to an in-vehicle network system. The in-vehicle network system includes an upper device, a second intermediate device, a second lower device, and a third lower device. The second intermediate device includes a first communication unit and a second communication unit that are arranged redundantly and that have a communication function. The second intermediate device is configured to communicate with the upper device via a plurality of communication paths. The second lower device is connected to the first communication unit of the second intermediate device. The third lower device is connected to the second communication unit of the second intermediate device and has a function equivalent to a function of the second lower device.

A third aspect of the disclosure relates to an in-vehicle network system. The in-vehicle network system includes an upper device, a first intermediate device, a third intermediate device, and a first lower device. The first intermediate device includes a first communication unit having a communication function and is configured to communicate with the upper device via a plurality of communication paths. The third intermediate device includes a third communication unit having a communication function and is configured to communicate with the upper device via a plurality of communication paths. The first lower device is connected to the first communication unit and the third communication unit.

A fourth aspect of the disclosure relates to an in-vehicle network system. The in-vehicle network system includes an upper device, a second intermediate device, a fourth intermediate device, a second lower device, and a third lower device. The second intermediate device includes a second communication unit having a communication function and is configured to communicate with the upper device via a plurality of communication paths. The fourth intermediate device includes a fourth communication unit having a communication function and is configured to communicate with the upper device via a plurality of communication paths. The second lower device is connected to the second communication unit. The third lower device is connected to the fourth communication unit and has a function equivalent to a function of the second lower device.

According to the disclosure, a highly robust in-vehicle network system can be provided since the configurations of the communication systems, the communication paths, and the devices are made redundant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram showing an example of failure occurrence locations of the network system according to the second embodiment of the disclosure.

DETAILED DESCRIPTION OF EMBODIMENTS

In the embodiments of the disclosure, a plurality of communication paths are provided between upper and lower devices of a network system. Alternatively, the network system includes two lower devices having equivalent functions, and the two lower devices communicate with the upper device via different communication paths. As a result, redundancy can be suitably provided to the network system, and robustness against failure that may occur in each unit can be improved.

First Embodiment

Figure 1:
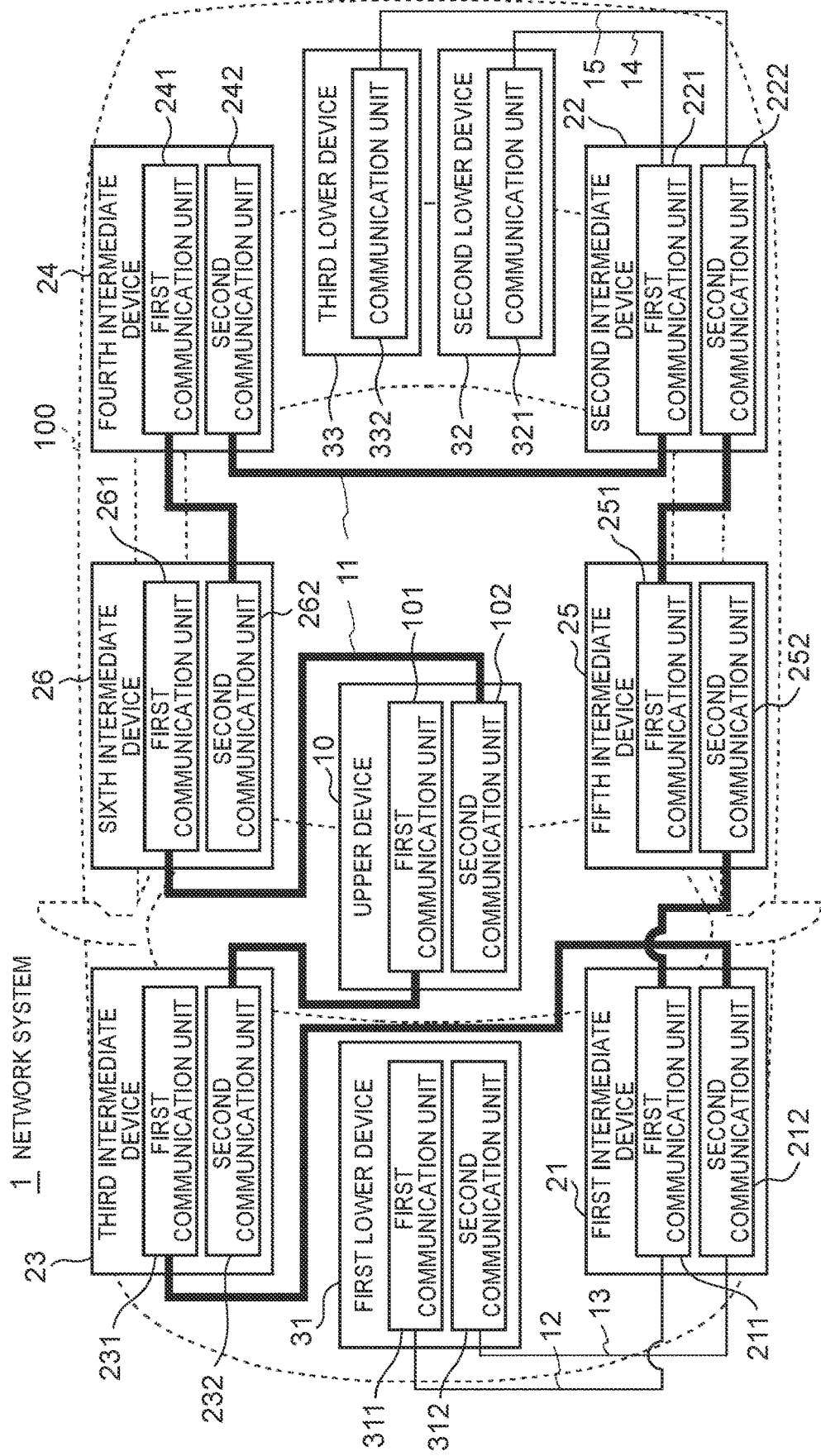
FIG. 1 is a diagram showing a configuration of a network system according to a first embodiment of the disclosure.

Hereinafter, a first embodiment of the disclosure will be described in detail with reference to the drawings.
Configuration FIG. 1 schematically shows a configuration of a network system 1 according to the present embodiment and an arrangement thereof in a vehicle 100.

In the present embodiment, the network system 1 includes an upper node, intermediate nodes, and lower nodes. The upper node is, for example, a relatively highly functional ECU that collectively executes calculations for various vehicle control functions. The lower node is, for example, a sensor, an actuator, or an ECU having a relatively specialized function for individually controlling the sensor or the actuator. The intermediate node is, for example, an ECU that functions as a gateway to relay communication between the upper node and the lower node.

The network system 1 includes an upper device 10 as the upper node. One or more intermediate devices, which serve as the intermediate nodes, are connected subordinate to the upper device 10 by, for example, a ring-type connection topology. That is, in the example shown in FIG. 1, a first intermediate device 21, a second intermediate device 22, a third intermediate device 23, a fourth intermediate device 24, a fifth intermediate device 25, and a sixth intermediate device 26 are respectively provided in a ring-type communication path with its both ends connected to the upper device 10, and are connected to the upper device 10 via another device or directly without intervention of another device.

Each intermediate device is connected to one or more lower devices which serve as the lower nodes. As an example of the lower devices, FIG. 1 shows a first lower device 31, a second lower device 32, and a third lower device 33, and the other lower devices are not shown. The first lower device 31 is connected to the first intermediate device 21. The second lower device 32 is connected to the second intermediate device 22. The third lower device 33 is connected to the second intermediate device 22.

In this example, the upper device 10 collects, via each intermediate device serving as a gateway, information on the vehicle 100 or information surrounding the vehicle 100 from the lower devices that control sensors. This information may include, for example, operation conditions of actuators, etc., driving conditions of the vehicle 100 such as a speed and an acceleration of the vehicle 100, environmental conditions such as roads, objects, etc. surrounding the vehicle 100, seating statuses of occupants, and details of operations performed on various components of the vehicle 100. Note that some switches, sensors, and the like such as a start switch may be directly connected to the upper device 10. In this case, the upper device 10 may acquire information from these switches, sensors, and the like without intervention of the intermediate devices. The upper device 10 performs calculations based on the information to generate control data. The control data is data for controlling various functions of the vehicle 100, such as an autonomous driving function, a self-parking function, drive assistance functions including collision avoidance, lane keeping, follow-up of the preceding vehicle, and maintaining speed, operational control of an engine, a transmission, a cooling device, and an air conditioner, charging and discharging control for a battery, lighting of headlamps in accordance with illuminance, permission of unlocking doors based on authentication using a mobile device (electronic key), and presentation of information to a user. The upper device 10 transmits the control data to the intermediate devices, and causes the intermediate devices to perform operation corresponding to the control data. The upper device 10 transmits, via the intermediate devices serving as gateways, the control data to the lower devices that control the actuators, and causes the lower devices to perform operation corresponding to the control data. In such a network system 1, total cost is reduced by integrating various control functions of the vehicle 100 into the highly functional upper device 10 and relatively simplifying the configurations of the intermediate devices and the lower devices instead.

Each of the above devices is typically configured to include a control unit, such as a processor or a microcomputer, and a memory. However, there may be lower devices that include sensors or actuators but do not include a control unit or a memory.

The upper device 10 is arranged, for example, in or near a center console of the vehicle 100. The intermediate devices are arranged separately in various positions of the vehicle 100. The lower devices are arranged at suitable positions according to their functions, and are typically directly connected to the nearest intermediate devices without intervention of other devices.

The upper device 10 includes a first communication unit 101 and a second communication unit 102.

The first intermediate device 21, the second intermediate device 22, the third intermediate device 23, the fourth intermediate device 24, the fifth intermediate device 25, and the sixth intermediate device 26 include a first communication unit 211, 221, 231, 241, 251, 261 and a second communication unit 212, 222, 232, 242, 252, 262, respectively. In each intermediate device, communication is appropriately relayed between the first communication unit and the second communication unit that are arranged inside thereof.

A first lower device 31 includes a first communication unit 311 and a second communication unit 312. The first lower device 31 is, for example, an electric power steering (EPS) system. The first lower device 31 is a device in which, in addition to a communication function, a power supply system and an actuator system are also duplexed and has a redundant configuration itself. For example, even if a failure occurs in one of the first communication unit 311 and the second communication unit 312, any one system in the first lower device 31 can be controlled through communication with the other communication unit.

The second lower device 32 includes a communication unit 321.

The third lower device 33 includes a communication unit 332.

The second lower device 32 and the third lower device 33 have functions equivalent to each other. These are, for example, sensors of a radio detection and ranging (radar) system and a laser-imaging detection and ranging (lidar) system used for a safety improvement function such as collision avoidance of the vehicle 100. As described above, the second lower device 32 and the third lower device 33 have functions equivalent to each other, which are detecting an object around the vehicle 100 and measuring the distance between the object and the vehicle 100. Here, the equivalent functions include not only completely identical functions but also similar and alternative functions. Unlike the first lower device 31, the second lower device 32 and the third lower device 33 do not have redundant configurations themselves, but achieve a redundant configuration as a whole as a safety improvement function with two devices having functions equivalent to each other. For example, if no failure occurs in a first communication system and a second communication system, the upper device 10 communicates with the first communication system of the second lower device 32 and the second communication system of the third lower device 33 via each intermediate device, thereby using both functions of the second lower device 32 and the third lower device 33 in a mutually complementary manner. If a failure occurs in one of the second lower device 32 and the third lower device 33, the upper device 10 communicates only with the other device and uses the function of the other device. In this way, the safety improvement function can be continuously executed. The second lower device 32 and the third lower device 33 may be two identical devices.

The upper device 10 and the intermediate devices are connected by communication lines 11 provided in a ring. Each communication unit described above is, for example, a communication integrated circuit (IC) when the communication standard is the Controller Area Network (CAN) (registered trademark) standard, and is, for example, an Ethernet switch when the communication standard is the Ethernet (registered trademark) standard.

Each of the upper device 10 and the intermediate devices has two communication units arranged redundantly, and the communication unit of each device is connected to the communication unit of one of the two adjacent devices. In the example shown in FIG. 1, the first communication unit 101 of the upper device 10 is connected to the second communication unit 232 of the third intermediate device 23. The first communication unit 231 of the third intermediate device 23 is connected to the second communication unit 212 of the first intermediate device 21. The first communication unit 211 of the first intermediate device 21 is connected to the second communication unit 252 of the fifth intermediate device 25. The first communication unit 251 of the fifth intermediate device 25 is connected to the second communication unit 222 of the second intermediate device 22. The first communication unit 221 of the second intermediate device 22 is connected to the second communication unit 242 of the fourth intermediate device 24. The first communication unit 241 of the fourth intermediate device 24 is connected to the second communication unit 262 of the sixth intermediate device 26. The first communication unit 261 of the sixth intermediate device 26 is connected to the second communication unit 102 of the upper device 10. With the devices connected in the above manner, even if a failure occurs in any of the communication units, the upper device 10 can communicate with any intermediate device including the intermediate device having the communication unit in which the failure has occurred, via a clockwise communication path or a counterclockwise communication path. In the example shown in FIG. 1, the first communication unit 101 and the second communication unit 102 of the upper device 10 perform communication in the counterclockwise communication path and communication in the clockwise communication path, respectively, based on their routing information.

The first communication unit 311 of the first lower device 31 and the first communication unit 211 of the first intermediate device 21 are connected to each other via a communication line 12, and the second communication unit 312 of the first lower device 31 and the second communication unit 212 of the first intermediate device 21 are connected to each other via a communication line 13. Further, the communication unit 321 of the second lower device 32 and the first communication unit 221 of the second intermediate device 22 are connected to each other via a communication line 14, and the communication unit 332 of the third lower device 33 and the second communication unit 222 of the second intermediate device 22 are connected to each other via a communication line 15.

Processing

Figure 2:
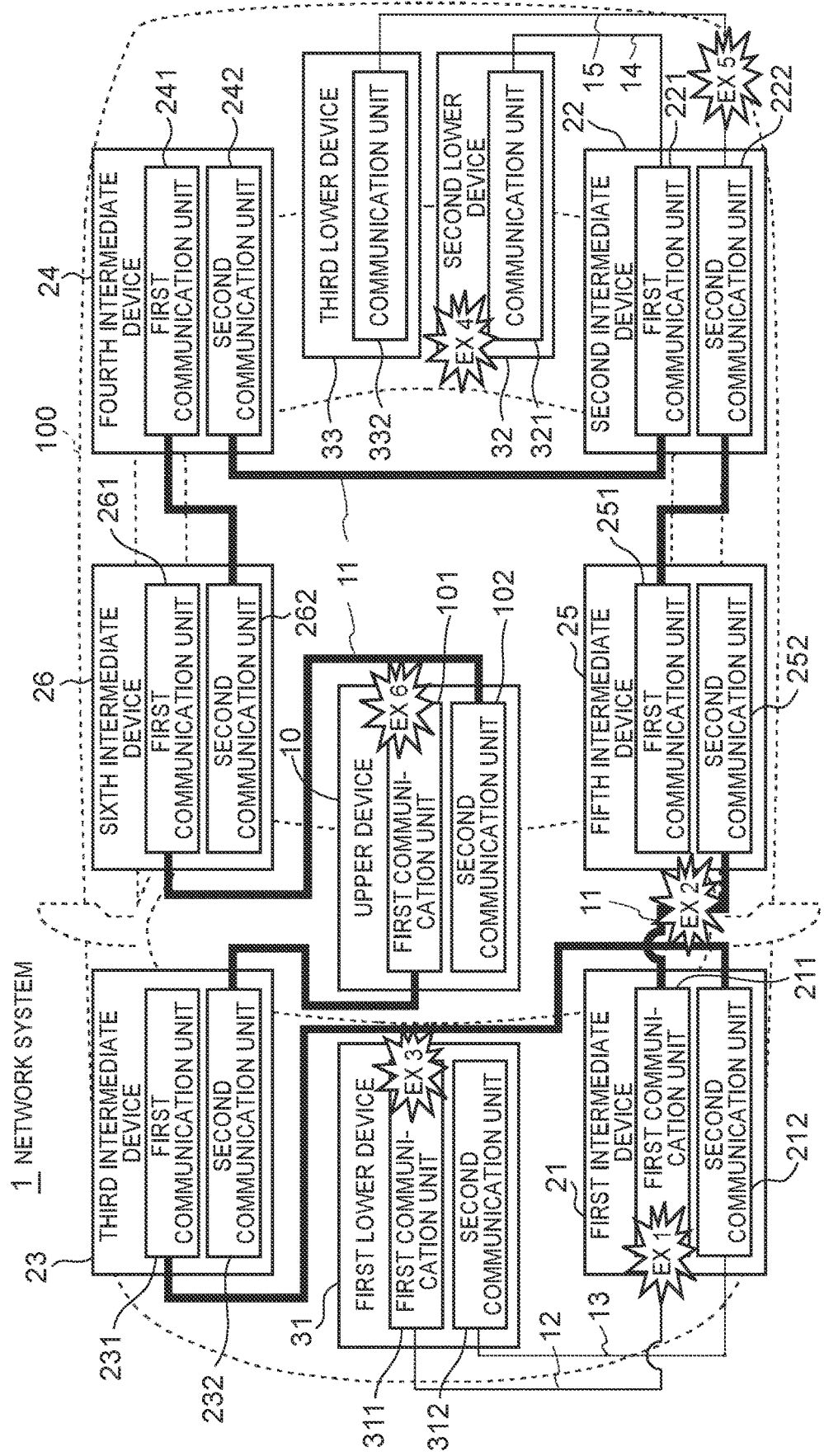
FIG. 2 is a diagram showing an example of failure occurrence locations of the network system according to the first embodiment of the disclosure.

Hereinafter, examples of processing when a failure has occurred in the network system 1 according to the present embodiment will be described. FIG. 2 shows failure occurrence locations in the examples.

EXAMPLE 1 (EX 1)

This example is an example in which a failure has occurred in the first communication unit 211 of the first intermediate device 21. In this case, the upper device 10 cannot communicate with the first lower device 31 via the first communication unit 211. However, the upper device 10 can continue to control the first lower device 31 by communicating with the second communication unit 212.

EXAMPLE 2 (EX 2)

This example is an example in which a failure has occurred in the communication line 11 between the first intermediate device 21 and the fifth intermediate device 25 due to disconnection or the like. In this case, the upper device 10 cannot communicate with the first lower device 31 via the sixth intermediate device 26, the fourth intermediate device 24, the second intermediate device 22, the fifth intermediate device 25, and the first intermediate device 21. However, the upper device 10 can continue to control the first lower device 31 by communicating with the first lower device 31 via the third intermediate device 23 and the first intermediate device 21.

EXAMPLE 3 (EX 3)

This example is an example in which a failure has occurred in the first communication unit 311 of the first lower device 31. In this case, the upper device 10 cannot communicate with the first lower device 31 via the first communication unit 311. However, the upper device 10 can continue to control the first lower device 31 by communicating with the second communication unit 312.

EXAMPLE 4 (EX 4)

This example is an example in which a failure has occurred in the second lower device 32. In this case, the upper device 10 cannot cause the second lower device 32 to perform its function. However, the upper device 10 can continue control by communicating with the third lower device 33 that has the function equivalent to that of the second lower device 32 and by using the function of the third lower device 33.

EXAMPLE 5 (EX 5)

This example is an example in which a failure has occurred in the communication line 15 between the third lower device 33 and the second intermediate device 22 due to disconnection or the like. In this case, the upper device 10 cannot cause the third lower device 33 to perform its function. However, the upper device 10 can continue control by communicating with the second lower device 32 that has the function equivalent to that of the third lower device 33 and by using the function of the second lower device 32.

EXAMPLE 6 (EX 6)

This example is an example in which a failure has occurred in the first communication unit 101 of the upper device 10. In this case, the upper device 10 cannot communicate with the intermediate devices with the first communication unit 101 via the counterclockwise communication path. However, since the upper device 10 can communicate with the intermediate devices with the second communication unit 102 via the clockwise communication path, the upper device 10 can continue to control the lower devices subordinate to the intermediate devices.

Effects

In the present embodiment, two communication paths are provided between the upper device and the lower devices. Alternatively, two lower devices having equivalent functions communicate with the upper device via different communication paths. In this way, redundancy can be suitably provided to the network system 1, and robustness against failure that may occur in each unit can be improved.

As shown in FIG. 1, separately arranging a plurality of intermediate devices in various positions of the vehicle 100 can facilitate connection of the lower devices with the nearby intermediate devices regardless of the positions of the lower devices in the vehicle 100. Two communication paths are provided in the present embodiment, but another communication path may be added to further increase redundancy.

Second Embodiment

Hereinafter, a second embodiment of the disclosure will be described with reference to the drawings. Description of items similar to those in the first embodiment will be omitted as appropriate.

Configurations

Figure 3:
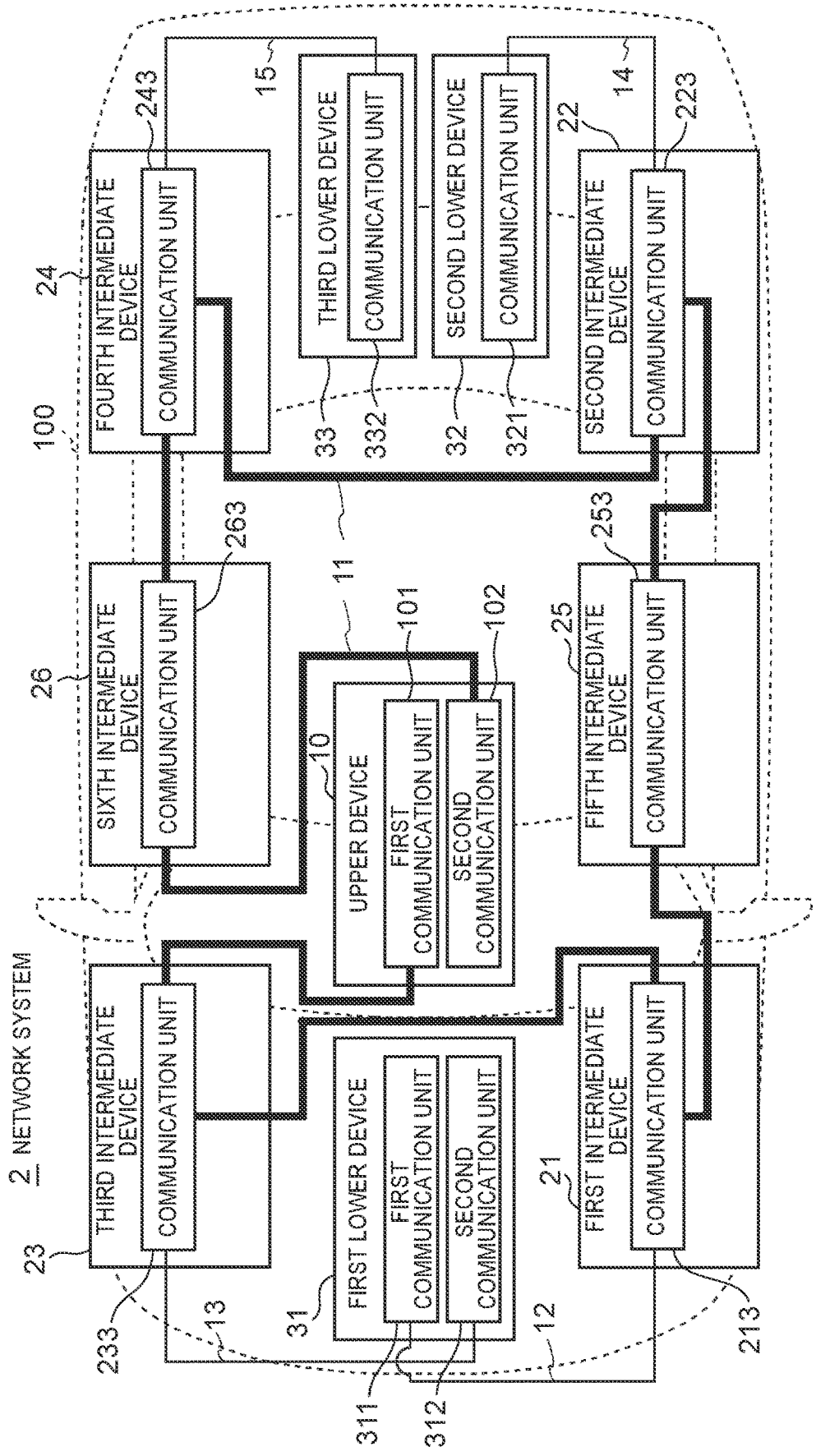
FIG. 3 is a diagram showing a configuration of a network system according to a second embodiment of the disclosure.

FIG. 3 schematically shows a configuration of a network system 2 according to the present embodiment and an arrangement thereof in the vehicle 100.

In the present embodiment, unlike the first embodiment, each intermediate device includes one communication unit. That is, the first intermediate device 21, the second intermediate device 22, the third intermediate device 23, the fourth intermediate device 24, the fifth intermediate device 25, and the sixth intermediate device 26 include one communication unit 213, 223, 233, 243, 253, 263, respectively. These are connected by the communication lines 11 provided in a ring. In the present embodiment, even if a failure occurs in any of the communication units, the upper device 10 can communicate with any intermediate device except the intermediate device having the communication unit in which the failure has occurred, via a clockwise communication path or a counterclockwise communication path.

Unlike the first embodiment, the first lower device 31 is connected to the third intermediate device 23 in addition to the first intermediate device 21. That is, the second communication unit 312 of the first lower device 31 is connected to the communication unit 233 of the third intermediate device 23 via the communication line 13. Further, unlike the first embodiment, the communication unit 332 of the third lower device 33 is connected to the communication unit 243 of the fourth intermediate device 24 via the communication line 15. In the present embodiment, unlike the first embodiment, if a failure occurs in any communication unit provided in the intermediate device, communication via the intermediate device cannot be performed. Therefore, measures are taken such as connecting one lower device to two intermediate devices, and connecting two lower devices having equivalent functions to different intermediate devices to ensure redundancy. The second communication unit 312 of the first lower device 31 may be connected, via the communication line 13, to any communication unit of an intermediate device other than the communication unit 233 of the third intermediate device 23 except the communication unit 213 of the first intermediate device 21 connected to the first communication unit 311 via the communication line 12.

Processing

Hereinafter, examples of processing when a failure occurs in the network system 1 according to the present embodiment will be described. FIG. 4 shows failure occurrence locations in the examples.

EXAMPLE 7 (EX 7)

This example is an example in which a failure has occurred in the communication unit 213 of the first intermediate device 21. In this case, the upper device 10 cannot communicate with the first lower device 31 via the first intermediate device 21. However, the upper device 10 can continue to control the first lower device 31 by communicating with the first lower device 31 via the third intermediate device 23.

EXAMPLE 8 (EX 8)

This example is an example in which a failure has occurred in the communication line 11 between the first intermediate device 21 and the fifth intermediate device 25 due to disconnection or the like. In this case, the upper device 10 cannot communicate with the first lower device 31 via the sixth intermediate device 26, the fourth intermediate device 24, the second intermediate device 22, the fifth intermediate device 25, and the first intermediate device 21. However, the upper device 10 can continue to control the first lower device 31 by communicating with the first lower device 31 via the third intermediate device 23 and the first intermediate device 21. Further, the upper device 10 can continue to control the first lower device 31 also by communicating with the first lower device 31 via the third intermediate device 23 and the communication line 13.

EXAMPLE 9 (EX 9)

This example is an example in which a failure has occurred in the first communication unit 311 of the first lower device 31. In this case, the first lower device 31 cannot communicate with the upper device 10 via the first communication unit 311. However, the first lower device 31 communicates with the upper device 10 via the second communication unit 312. Thereby, the upper device 10 can continue to control the first lower device 31.

EXAMPLE 10 (EX 10)

This example is an example in which a failure has occurred in the second lower device 32. In this case, the upper device 10 cannot cause the second lower device 32 to perform its function. However, the upper device 10 can continue control by communicating with the third lower device 33 that has the function equivalent to that of the second lower device 32 and by using the function of the third lower device 33.

EXAMPLE 11 (EX 11)

This example is an example in which a failure has occurred in the communication line 15 between the third lower device 33 and the fourth intermediate device 24 due to disconnection or the like. In this case, the upper device 10 cannot cause the third lower device 33 to perform its function. However, the upper device 10 can continue control by communicating with the second lower device 32 that has the function equivalent to that of the third lower device 33 and by using the function of the second lower device 32.

EXAMPLE 12 (EX 12)

This example is an example in which a failure has occurred in the first communication unit 101 of the upper device 10. In this case, the upper device 10 cannot communicate with the intermediate devices with the first communication unit 101 via the counterclockwise communication path. However, since the upper device 10 can communicate with the intermediate devices with the second communication unit 102 via the clockwise communication path, the upper device 10 can continue to control the lower devices subordinate to the intermediate devices.

Effects

In the present embodiment, as in the first embodiment, two communication paths are provided between the upper device and the lower devices. Alternatively, two lower devices having the equivalent functions can communicate with the upper device via different communication paths. In this way, redundancy can be suitably provided to the network system 2, and robustness against failure that may occur in each unit can be improved. In particular, in the present embodiment, one communication unit is provided in each intermediate device, thereby cost can be suppressed as compared with the first embodiment in which two communication units are provided in each intermediate device.

As shown in FIG. 3, as in the first embodiment, separately arranging a plurality of intermediate devices in various positions of the vehicle 100 can facilitate connection of the lower devices with the nearby intermediate devices regardless of the positions of the lower devices in the vehicle 100. In the above embodiments, two communication paths are provided by providing a ring communication path.

Alternatively, other routes may be further added so that three or more communication paths are provided between the upper device 10 and each intermediate device.

The disclosure is not limited to the above embodiments, and may be appropriately modified by, for example, partially implementing or combining the features of the embodiments.

The disclosure is not limited to be applied to the network system, and can be applied to an in-vehicle device such as a device included in the network system, a control method executed by an in-vehicle device having a processor and a memory, a control program, a computer-readable non-transitory storage medium that stores the control program, and a vehicle equipped with the network system, etc. The disclosure can be applied to network systems other than a network system mounted on the vehicle.

The disclosure is advantageous for a network system mounted on a vehicle or the like.

What is claimed is:

1. An in-vehicle network system comprising:
    an upper device;
    a first intermediate device including a first communication unit and a second communication unit that are arranged redundantly and that have a communication function, the first intermediate device being configured to communicate with the upper device via a plurality of communication paths; and
    a first lower device connected to the first communication unit and the second communication unit of the first intermediate device.

2. The in-vehicle network system according to claim 1, wherein:
    the first intermediate device is configured to function as a gateway that relays communication between the upper device and the first lower device;
    the upper device is configured to create control data for controlling an actuator mounted on a vehicle and transmit the control data to the first lower device via the first intermediate device; and
    the first lower device is configured to control the actuator based on the control data.

3. The in-vehicle network system according to claim 1, wherein:
    the in-vehicle network system includes a plurality of intermediate devices including the first intermediate device; and
    the upper device and the intermediate devices are connected to each other by a communication line provided in a ring.

4. The in-vehicle network system according to claim 1, wherein the first lower device includes a first lower communication unit connected to the first communication unit of the first intermediate device, and a second lower communication unit connected to the second communication unit of the first intermediate device.

5. An in-vehicle network system comprising:
    an upper device;
    a second intermediate device including a first communication unit and a second communication unit that are arranged redundantly and that have a communication function, the second intermediate device being configured to communicate with the upper device via a plurality of communication paths;
    a second lower device connected to the first communication unit of the second intermediate device; and
    a third lower device connected to the second communication unit of the second intermediate device and having a function equivalent to a function of the second lower device.

6. An in-vehicle network system, comprising:
an upper device;
a first intermediate device that includes a first communication unit having a communication function and that is configured to communicate with the upper device via a plurality of communication paths;
a third intermediate device that includes a third communication unit having a communication function and that is configured to communicate with the upper device via a plurality of communication paths; and
a first lower device connected to the first communication unit and the third communication unit.

7. An in-vehicle network system comprising:
an upper device;
a second intermediate device that includes a second communication unit having a communication function and that is configured to communicate with the upper device via a plurality of communication paths;
a fourth intermediate device that includes a fourth communication unit having a communication function and that is configured to communicate with the upper device via a plurality of communication paths;
a second lower device connected to the second communication unit; and
a third lower device connected to the fourth communication unit and having a function equivalent to a function of the second lower device.

\* \* \* \* \*